J. B. THOMAS.
Distance-Measuring Instruments.
No. 155,997. Patented Oct. 13, 1874.
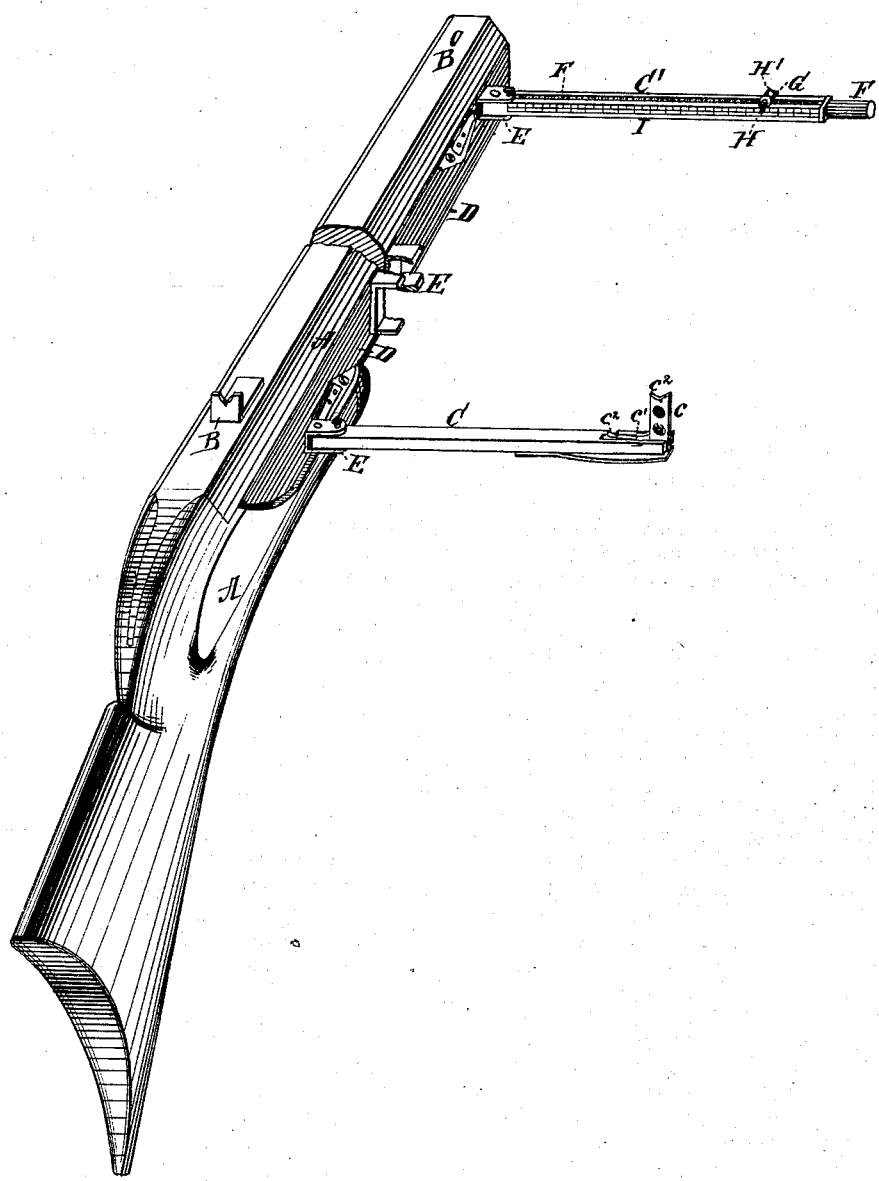
WITNESSES:
G. Mathys.
Solon C. Kemon
INVENTOR:
Jas. B. Thomas
BY
ATTORNEYS.

UNITED STATES PATENT OFFICE.

JAMES B. THOMAS, OF MONTGOMERY, OHIO.

IMPROVEMENT IN DISTANCE-MEASURING INSTRUMENTS.

Specification forming part of Letters Patent No. 155,997, dated October 13, 1874; application filed August 12, 1874.

*To all whom it may concern:*

Be it known that I, JAMES B. THOMAS, of Montgomery, in the county of Hamilton and State of Ohio, have invented a new and Improved Distance-Measurer Attachment; and I do hereby declare that the following is a full, clear, and exact description of the same, reference being had to the accompanying drawing forming a part of this specification.

The invention will first be fully described, and then pointed out in the claim.

The drawing is a perspective view of my measurer, which may be attached to a fire-arm, cane, or other arm usually transportable.

A represents a small fire-arm, although the measurer may with equal, if not greater, utility be applied to a large one. B B are the ordinary sights; and C C', two rods, hinged so as to stand horizontal and at right angles to the barrel D, and to fold inwardly between the guards E E. On the end of rod C is a hinged sight, c, that stands vertically at right angles thereto, and so hinged as to fold within a slot, $c^1$, the excisions $c^2$ $c^2$ in rod and sight allowing the latter to be conveniently lifted by the finger-nail. The rod C' is hollow, and contains a swiveled screw, F, on which travels a nut, G, carrying a pointer, H, and sight H'. The latter is perpendicular, and points to the figures marked upon a scale, I. A rod or some other measure of distance is taken as a unit, and the instrument applied experimentally until the spaces between the degrees of measurement are accurately obtained; or the space between the first and second units being obtained the others may be secured by mathematical calculation.

The application is as follows: When the object is in view, the user of the fire-arm turns out the rods C C' until they are parallel, turns up the sight c, and ranges the object by the sights B B. If the operator has a secure rest, he, or if not an assistant, now turns the rod C until he also can sight the object, and he now screws up the sight H' until within range of the object from sight c. The pointer will then indicate the exact distance of the object.

In the western country, where surveys are constantly being made, and the land is laid off by government agents, the surveyor may be always prepared for game, for Indians, or for measuring land with but a trifling addition of weight to his trusty rifle.

$a$ $a^1$ $a^2$ are springs to hold the jointed rods and sight in position; or I may simply use pins $b$ $b$ for the rods.

Having thus described my invention, what I claim as new is—

A measurer attachment, consisting of the jointed folding arms C C', one having hinged sight C, folding in slot $c'$, and the other having swiveled screw F, traveling sight and pointer, nut G, and scale I, all applied to a piece, A, and folding up thereto, in the manner described.

JAMES B. THOMAS.

Witnesses:
SOLON C. KEMON,
W. W. HOLLINGSWORTH.